United States Patent [19]

Kuchenbrod

[11] Patent Number: 4,475,528

[45] Date of Patent: Oct. 9, 1984

[54] PORTABLE COOKING APPARATUS

[76] Inventor: Gary W. Kuchenbrod, Armstrong, Ill. 61812

[21] Appl. No.: 541,531

[22] Filed: Oct. 13, 1983

[51] Int. Cl.³ ............................................. F24C 1/16
[52] U.S. Cl. ...................................... 126/9 R; 126/29
[58] Field of Search ...................... 126/9 R, 9 B, 25 R, 126/29, 30, 38

[56] References Cited

U.S. PATENT DOCUMENTS

| | | | |
|---|---|---|---|
| 2,307,914 | 1/1943 | Bitney | 126/9 R |
| 2,384,272 | 9/1945 | Baxter | 126/9 R |
| 2,408,859 | 10/1946 | Leake | 126/9 R |
| 2,477,529 | 7/1949 | Sprinkle et al. | 126/9 R |
| 2,515,521 | 7/1950 | Loffredo | 126/9 R |
| 2,631,579 | 3/1953 | Metzger | 126/9 R |
| 2,959,165 | 11/1960 | Mark | 126/9 R |
| 3,428,004 | 2/1969 | Phillips | 126/9 R |
| 3,593,701 | 7/1971 | Youmans | 126/9 R |
| 3,604,408 | 9/1971 | Tescula | 126/25 R |
| 3,785,360 | 1/1974 | Martin | 126/30 |
| 4,203,427 | 5/1980 | Way | 126/9 R |
| 4,334,516 | 7/1982 | Dittmer | 126/25 R |
| 4,338,912 | 7/1982 | Gaskins | 126/9 R |

Primary Examiner—Daniel J. O'Connor
Attorney, Agent, or Firm—McDougall, Hersh & Scott

[57] ABSTRACT

A portable cooking apparatus is provided which comprises two or more substantially planar cooking structures, hinge means connecting the cooking structures, a plurality of legs capable of detachable affixment to said cooking structures, and a leg carrier assembly affixed to the cooking structures, wherein the leg carrier assembly includes at least two guide members, each of which contains at least one aperture of a size and shape sufficient to admit at least one of said legs, the guide members being affixed to a first cooking structure such that a leg may rest in the apertures of at least two guide members simultaneously, and at least two retaining elements, each retaining element being affixed to a cooking structure such that, when the cooking apparatus is collapsed, each retaining element at least partially opposes end-wise movement of a leg as the leg rests in the apertures of the guide members.

15 Claims, 6 Drawing Figures

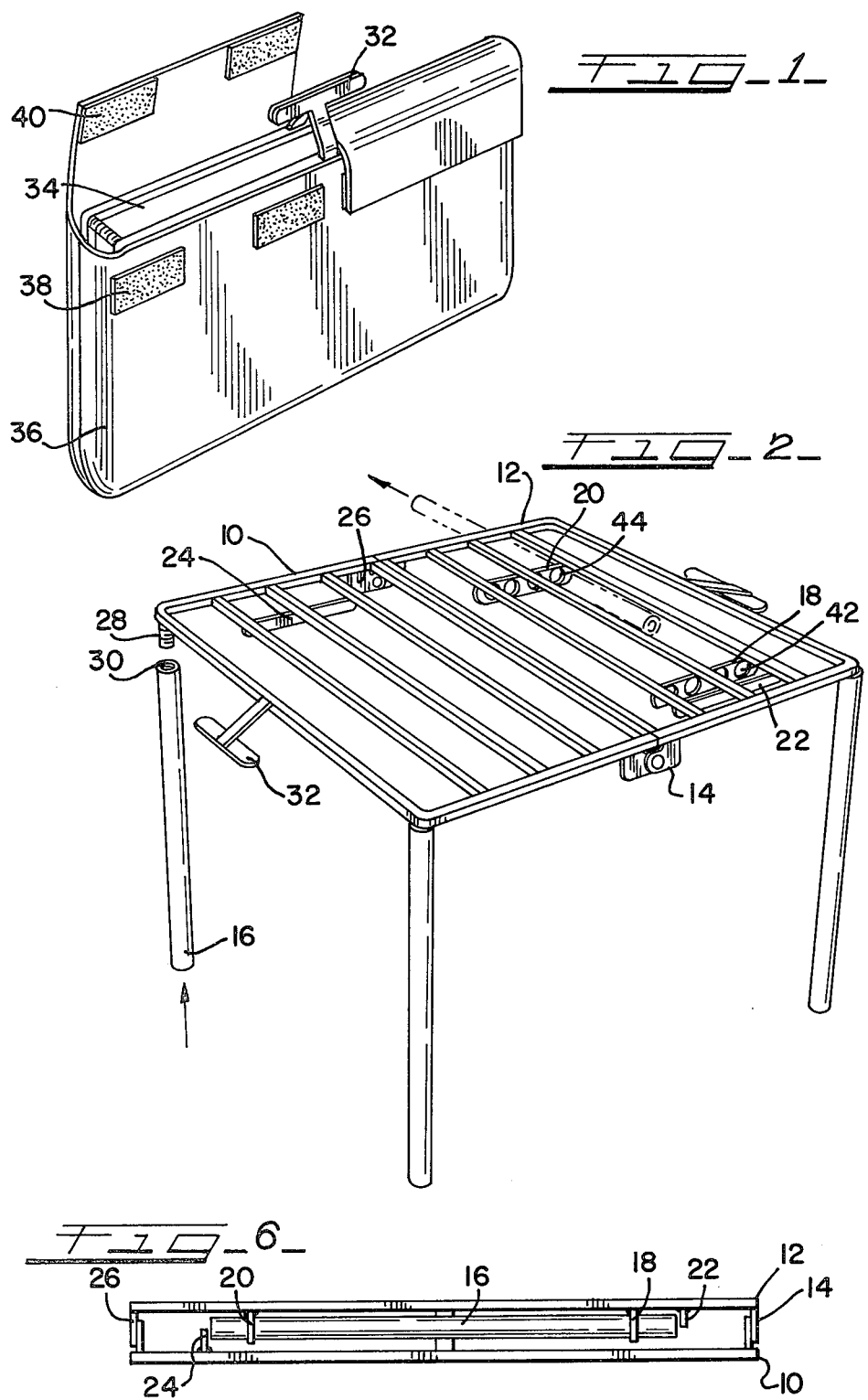

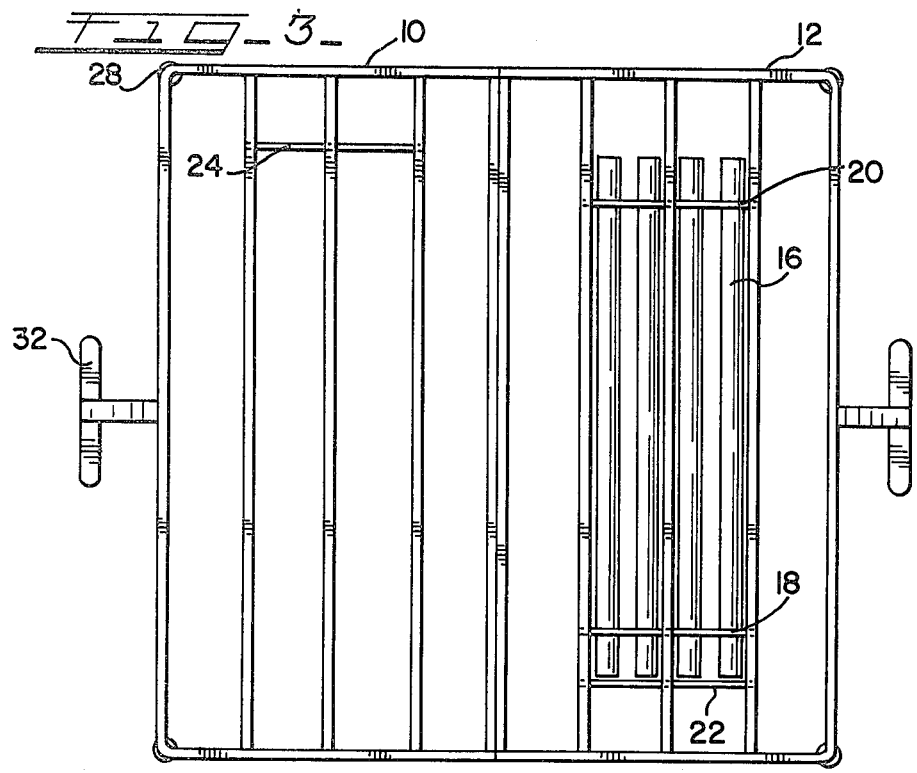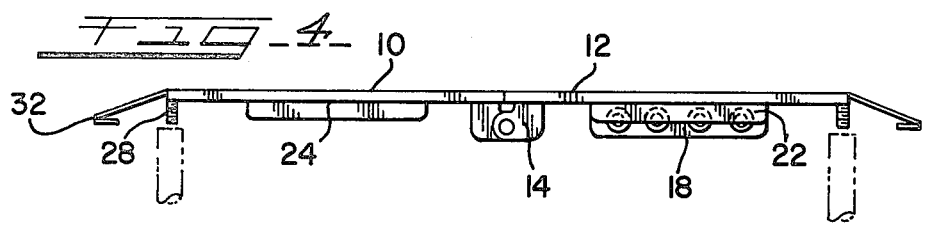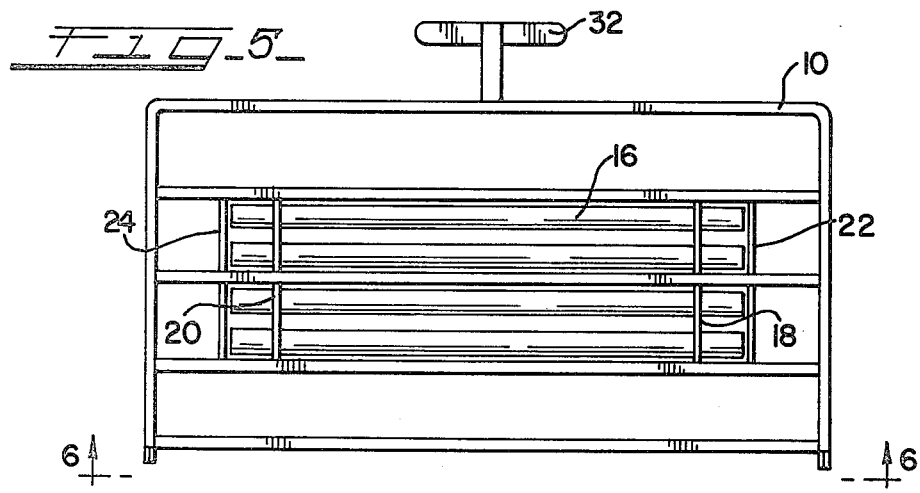

PORTABLE COOKING APPARATUS

BACKGROUND OF THE INVENTION

The present invention relates to a portable cooking apparatus which is constructed so that the disassembled parts may be fitted together for easy and secure storage and transportation. More specifically, the present invention relates to a kit comprising a portable cooking apparatus and carrying case.

Many portable camp stoves and cooking grills are known in the art. U.S. Pat. No. 1,403,842 to Chambers et al. discloses a portable camp stove comprising a cooking surface, foldable legs attached to the cooking surface, and adjustable panels extending downward from the cooking surface. These panels may be adjusted to direct the flow of air to the combustible material used in conjunction with the stove, and to shield the user of the stove from flames. A similar camping grate is disclosed in U.S. Pat. No. 1,435,747 to Seiling. Both the camp stove of Chambers and the camping grate of Seiling are disclosed as being capable of being folded into a compact form for carrying.

A collapsible stove is also disclosed in U.S. Pat. No. 1,569,401 to Sims. This stove comprises a hinged grill portion, rigidly self-supporting side panels hinged to the grill and adapted to support the grill, and an end panel adapted for engagement with the side panels to hold the side panels in a supporting position. This collapsible stove also includes a latch member or clasp for securing the stove in a folded condition.

Another portable cooking device is disclosed in U.S. Pat. No. 2,058,172 to Myers. This device comprises a grill, bars attached to and extending laterally from the grill, and two notched supporting members. These supporting members may be affixed to a fire box and are adapted so that the height of the grill may be adjusted by resting the bars in various notches of the supporting members.

A portable grill is also disclosed by U.S. Pat. No. 3,611,912 to Choe. This grill comprises a hinged carrying case which may be opened to form an elongated planar grill base or a countertop. This grill also comprises legs which may be extended from the case to support the grill base in an elevated position. The grill also contains side walls which may be fitted into the case and attached to the top of the base to form supports for solid fuels such as coals. The supports may also assist in grilling or rotisserie operations.

U.S. Pat. No. 3,837,328 to Schaffer discloses a collapsible grill having a grate which is capable of being rolled up and which, when unrolled, forms a rectangular grate. This grate is supported on a pair of crossed support members which are elevated from the ground by supporting legs hingeably affixed thereto.

A grill which is adjustable for height is disclosed in U.S. Pat. No. 4,109,567 to Gage et al. This grill comprises a grate with hollow cylindrical leg holders attached to the grate. Each leg holder may telescopically receive one of four legs. Each leg has axially spaced, radiantly extending lugs which are aligned with the lugs on the other legs. The height of the grill may be adjusted by aligning the lugs with slots in the leg holders and sliding the legs to the proper vertical position. The legs are then rotated so that the lugs underlie solid portions of the leg holders. Other portable cooking devices related in certain respects to the present invention are disclosed in U.S. Pat. Nos. 2,058,836 to Silver, 2,148,439 to Crawford and 4,133,335 to Malafouris.

Previous portable camp stoves and cooking grills suffer from several disadvantages. These stoves and grills often are structurally complex, making them unduly susceptible to problems caused by failure of any of their many parts. Also, previous portable stoves and grills are relatively heavy or bulky. This makes them inherently unsuitable for transportation over long distances or for situations where space is at a premium. It is in part for these reasons that the majority of portable stoves and grills are inherently unsuitable for use in activities such as backpacking, extended canoe trips, ski touring and other activities where lightness, compactability and reliability are a necessity.

Many prior stoves and grills also are difficult to assemble and dismantle. Further, many of these devices may not be disassembled so that the parts are securely held in a compact, self-contained unit which protects the disassembled parts from being damaged or misplaced.

It is therefore an object of the invention to provide a portable cooking apparatus which is simple, easy to dismantle and to assemble, requires a minimum of parts, and which, when disassembled, may be packed together as a self-contained unit for easy and secure transportation and storage.

These and other objects and advantages of the present invention will become apparent from the following description.

SUMMARY OF THE INVENTION

In general, the present invention comprises a portable cooking apparatus comprising two or more substantially planar cooking structures, hinge means connecting the cooking structures, a plurality of legs capable of detachable affixment to the cooking structures, and a leg carrier assembly. The leg carrier assembly is affixed to the cooking structures and comprises (a) at least two guide members, each of which contains apertures for receiving the legs, affixed to one of the cooking structures such that a leg may simultaneously rest in the apertures of at least two structures; and (b) at least two retaining elements, each of which is affixed to a cooking structure. When the apparatus is collapsed, each retaining element at least partially opposes end-wise movement of the legs resting in the apertures of the guide members so that the legs are held securely between the cooking structures.

BRIEF DESCRIPTION OF THE DRAWINGS

FIG. 1 depicts an embodiment of the present invention wherein the cooking apparatus is in a disassembled and collapsed state within a carrying case.

FIG. 2 is a perspective view of an embodiment of the present invention wherein the cooking apparatus is substantially assembled.

FIG. 3 is a top view of the embodiment of the invention shown in FIG. 2 with the legs disassembled and placed in the proper position for storage.

FIG. 4 is a partial side view of the embodiment of FIG. 2.

FIG. 5 is a view of the embodiment of FIG. 2 wherein the legs are disassembled and placed in a proper position for storage and the apparatus is collapsed.

FIG. 6 is an end view of the embodiment of FIG. 2 depicting the present invention wherein the apparatus is collapsed and the legs are disassembled and placed in a proper position for storage.

DETAILED DESCRIPTION OF THE INVENTION

Referring now to FIG. 2, the portable cooking apparatus of the present invention comprises two or more cooking structures, shown at 10 and 12, hinge means 14, 26 connecting the cooking structures, a plurality of legs 16 capable of detachable affixment to the cooking structures 10, 12, and a carrier assembly. The carrier assembly is affixed to the cooking structures 10,12 and comprises at least two guide members 18, 20 and at least two retaining elements 22, 24.

The cooking structures are substantially planar structures which provide a surface upon which to cook food, either directly or inside of utensils such as foil or pans. The configuration of these structures is not critical to the present invention, but may consist of a set of approximately parallel rods to form a grill, or may comprise a continuous sheet of material for use as a griddle.

The portable cooking apparatus also comprises hinge means, such as the hinges shown at 14, 26. Preferably these hinges are positioned at the ends of the margins wherein the cooking structures abut each other.

The apparatus includes a plurality of legs capable of affixment to the cooking structures 10, 12, to form a structurally stable cooking apparatus. These legs, when detached from the cooking structures, are stored in the carrier assembly. The means of attaching the legs to the cooking structures is not critical, and may be accomplished by a variety of means known in the art. These means include bolts on the legs which may be threaded through holes in the cooking structures and affixed to the cooking structures by nuts. Additional means may involve lugs, or matching threads on the cooking structures, such as shown at 28 and on at least one end of the legs, at 30.

The configuration of the legs is not critical to the present invention. Cylindrical legs are, however, preferred due to their simplicity of manufacture and storage in the carrier assembly. In the preferred embodiment of the present invention, these legs comprise substantially tubular pieces of metal, shown at 16. These legs are affixed to the cooking surfaces by means of matching threads 28, 30 on the inside of the leg tubes and on the cooking surface.

When detached from the cooking surfaces, the legs may be stored in the carrier assembly for easy and secure transportation and storage. This carrier assembly comprises at least two guide members 18, 20 and at least two retaining structures 22, 24. Each of the guide members contains one or more apertures 42, 44 of a size and shape sufficient to admit the legs. As shown in FIG. 6, the guide members 18, 20 are affixed to the cooking structure 12 such that a leg 16 may rest in the apertures of the two guide members 18, 20 simultaneously.

The configuration of the guide members, apart from containing one or more apertures, is not critical to the present invention but may comprise fenestrated plates, grids or loops. It is preferred, however, that the guide members comprise fenestrated plates as shown in the drawings due to their ease of manufacture and affixment to the cooking structure. These fenestrated plates preferably are affixed to the cooking structure, by known means such as welding, such that the plates are substantially parallel.

The number of apertures in each guide member will depend on the number of legs to be stored. A cooking apparatus having four legs may therefore be equipped with two guide members having four apertures each. The guide members may have additional apertures for the storage of replacement legs, or additional carrier assemblies may be included for legs of another length.

Referring to FIG. 3, at least one of the retaining structures 24 is affixed to a cooking structure 10 other than the cooking structure 12 to which the guide members 18, 20 are affixed. This arrangement permits the easy insertion into and retrieval of the detached legs from the apertures of the guide structures. If desired, both retaining elements may be affixed to a cooking structure other than the one to which the guide members are affixed. However, it is preferred that at least one retaining element 22 be affixed to the same cooking structure as the guide members because this permits greater manipulation of the cooking apparatus during assembly or disassembly without the legs falling out of the guide structures.

The retaining elements 22, 24 are positioned on the cooking structures such that when the apparatus is collapsed, as shown in FIGS. 5 and 6, the retaining elements oppose end-wise movement of the legs in the apertures of the guide members. This prevents the legs from falling out of the cooking apparatus when the apparatus is in the disassembled state.

The configuration of the retaining elements is not critical to the present invention as long as the retaining structures at least partially oppose end-wise movement of the legs as they rest in the apertures of the guide members. These retaining elements may comprise fenestrated plates which are affixed to the cooking structures such that the fenestra do not match the apertures in the guide members, or may comprise continuous plates as shown in the drawings at 22, 24. As shown in FIG. 5, when the guide members constitute fenestrated plates, the retaining plates 22, 24 preferably are affixed to the cooking structures such that each is substantially parallel to the most proximal fenestrated plate.

The retaining elements or guide members may be affixed to either the upper or lower surfaces of the cooking structures, consistent with the present invention. For example, when the cooking apparatus has three cooking structures and collapses according to a tri-fold arrangement, at least one retaining element or the guide members may be on the upper surface. In the preferred embodiment wherein the cooking apparatus comprises two cooking structures, both retaining structures are affixed to lower surfaces of the cooking apparatus.

As seen in FIGS. 2 and 3, a handle may be attached to the cooking surfaces to facilitate manipulation and carrying of the cooking apparatus. The configuration of this handle is not critical to the present invention but may comprise any of a number of configurations known in the art.

The present invention also includes the embodiment depicted in FIG. 1 of a kit comprising the portable cooking apparatus 34 and a carrying case 36 which is capable of containing the cooking apparatus when the apparatus is in a disassembled and collapsed state. The carrying case may be made of nylon, dacron, canvas or other fabrics which are sufficiently light and durable under the conditions of use. When a handle 32 is attached to the cooking apparatus, this carrying case should contain an aperture to permit the handle to extend beyond the carrying case. This carrying case may also have means, such as Velcro strips 38, 40, for fixable closure of the carrying case to protect the cooking apparatus from being soiled or soiling other items when the apparatus is being stored or transported.

The apparatus, as depicted in FIG. 2, may be disassembled and collapsed for storage by the unscrewing of the legs 16, sliding the legs into the apertures 42, 44 in the guide members 18, 20. As shown in FIG. 6, the cooking structures 10, 12 are then folded along hinge means 14, 26 so that the carrier assembly is sandwiched between the cooking structures and the retaining elements 22, 24 block endwise movement of the legs so that the legs rest securely in the apertures of the guide members.

It will be understood that various changes and modifications may be made in the above described device without departing from the spirit of the invention, particularly as defined in the following claims.

What is claimed is:

1. A portable cooking apparatus comprising:
   (a) two or more substantially planar cooking structures;
   (b) hinge means connecting said cooking structures;
   (c) a plurality of legs capable of detachable affixment to said cooking structures; and
   (d) a leg carrier assembly affixed to said cooking structures, including;
      (i) at least two guide members, each of which contains at least one aperture of a size and shape sufficient to admit at least one of said legs, the guide members being affixed to a first cooking structure such that a leg may rest in the apertures of at least two guide members simultaneously;
      (ii) at least two retaining elements, each retaining element being affixed to a cooking structure such that, when the cooking apparatus is collapsed, each retaining element at least partially opposes end-wise movement of a leg as said leg rests in the apertures of the guide members.

2. The apparatus of claim 1 wherein each guide member contains at least as many apertures as the number of legs necessary to support said cooking structures in use.

3. The apparatus of claim 1 wherein the guide members are affixed to the cooking structure such that the apertures of each guide member are in alignment.

4. The apparatus of claim 1 wherein the guide structures comprise fenestrated plates.

5. The portable cooking apparatus of claim 4 wherein the fenestrated plates are substantially parallel to each other.

6. The portable cooking apparatus of claim 5 wherein each retaining element comprises a plate and is affixed to the cooking structure such that each retaining plate is substantially parallel to the most proximal fenestrated plate.

7. The cooking apparatus of claim 1 wherein said guide members are on the lower face of said cooking structure when said cooking apparatus is assembled.

8. The apparatus of claim 1 wherein at least one retaining element is affixed to a cooking structure other than the cooking structure to which the guide members are affixed.

9. The apparatus of claim 1 wherein at least one retaining element is affixed to the same cooking structure to which the guide members are affixed.

10. The apparatus of claim 1 wherein the retaining elements comprise plates.

11. The apparatus of claim 1 wherein the apparatus comprises at least two leg carrier assemblies.

12. The cooking apparatus of claim 1 wherein said legs are detachably affixed to said cooking structures by matching threads on the legs and the cooking structures.

13. The cooking apparatus of claim 1 wherein a handle is affixed to a cooking structure.

14. A kit comprising the portable cooking apparatus of claim 1, and a carrying case capable of containing said cooking apparatus when said cooking apparatus is in a collapsed state.

15. The kit of claim 14 wherein said carrying case contains at least one aperture to permit a handle affixed to said cooking apparatus to extend beyond said carrying case.

* * * * *